Jan. 28, 1930. C. O. GRANBERG 1,745,253
BLOWER
Filed Sept. 26, 1927  2 Sheets-Sheet 1

INVENTOR.
Charles O. Granberg
BY
ATTORNEY

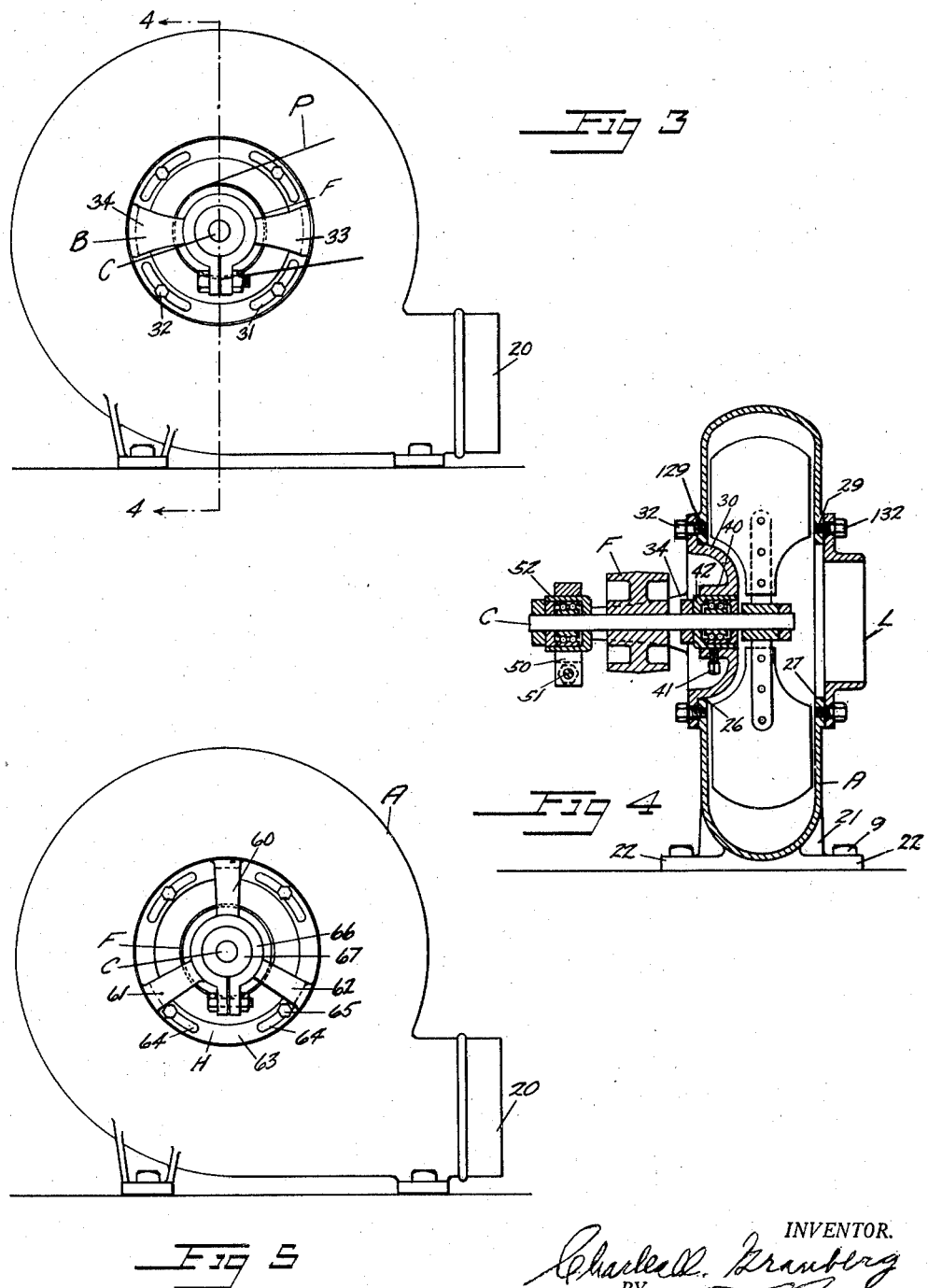

Patented Jan. 28, 1930

1,745,253

UNITED STATES PATENT OFFICE

CHARLES O. GRANBERG, OF EXETER, NEW HAMPSHIRE

BLOWER

Application filed September 26, 1927. Serial No. 221,986.

This invention relates to blowers driven by power and of the type especially used in connection with saw mills for disposing of saw dust.

Such blowers comprise a fan or paddle wheel, the blades of which may be moved directly at right angles with their rotative movement or at an angle therewith, enclosed in a casing having an air outlet at the edge and an air inlet, usually of circular form, the center of which is opposite the axis of the blower shaft.

The casing is formed of oppositely disposed dish shaped walls surrounding the fan.

In setting up such blowers it is sometimes desirable that the shaft and belting should be on one side and sometimes on the other, and that where a pulley is used that the supports for the shaft and pulley should permit a belt to be extended in any radial direction. It is also desirable that the drive shaft should be hung on ball or roller bearings and that the whole equipment should be rigid and free from vibration. It is also desirable that the attaching base of the blower should be of such character that a few bolts will hold it in place and that it can be attached to a vertical wall or a horizontal floor.

It is also frequently necessary that the inlet should be close to a wall and it is desirable that the inlet should be obstructed as little as possible.

In the drawings, Fig. 1 is a perspective of a blower equipped with my device.

Fig. 3 is a side elevation as from the left of Fig. 1.

Fig. 4 is a vertical section looking in the direction of the arrow on the line 4—4 of Fig. 3.

Fig. 5 is a view similar to Fig. 3, of a modification.

Figure 1:
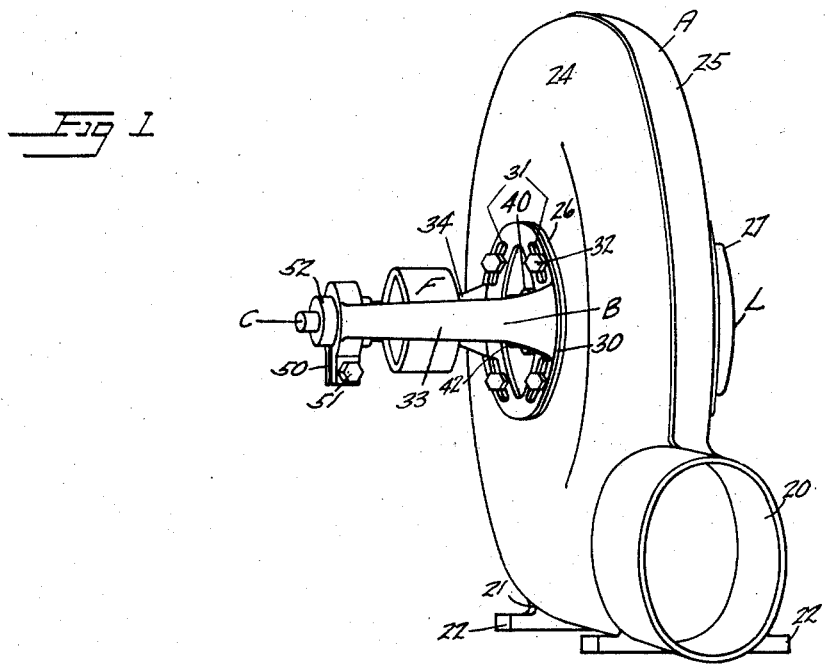
Figure 2:
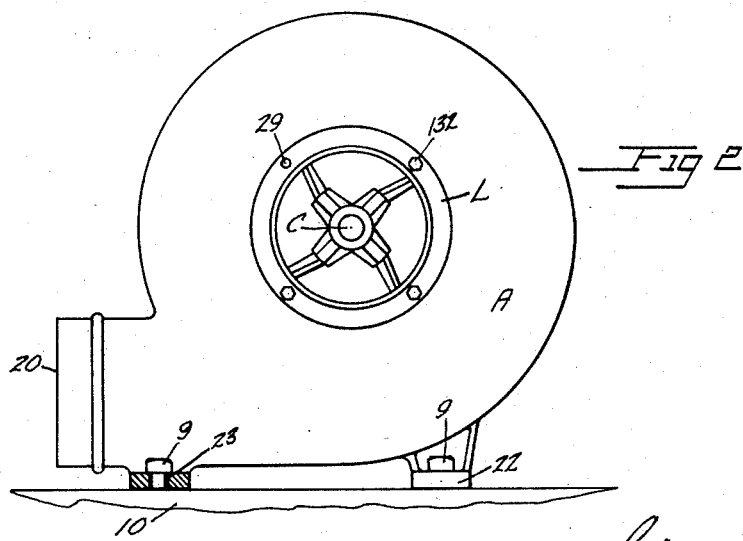
Fig. 2 is a side elevation as from the right of Fig. 1.

In the drawings, A represents the blower casing having an air outlet 20 and a base 21 from which project the lugs 22 through which are the holes 23 by which it can be fastened in position by means of screws 9 as to a horizontal floor 10 or to a vertical wall.

This casing is formed of two dish shaped walls 24 and 25 in each of which is a flanged opening 26 or 27 having a plurality of screw holes for the attaching screws for the hanger B to be described. These circular central openings 26 and 27 are oppositely disposed in such position that the axis of drive shaft C preferably passes through their centers.

The hanger B comprises a supporting disc 30 in which are a plurality of circumferential fastening slots 31, 31, through which screws such as 32 pass into the screw holes 129 in the flanged opening 26 whereby the whole hanger can be turned to the limit of the slots so that its arms 33 and 34 will clear a belt such as for instance P shown in Fig. 3.

This disc 30 carries at its center an inner hub clamp 40 which by means of a set screw 41 can hold a ball or roller bearing 42 in place as a bearing for shaft C.

The hanger arms 33 and 34 are fixed to disc 30 and extend out therefrom so as to support an outer split clamp 50 which by means of a screw 51 can be tightened on the outer shaft ball bearing 52 which supports the outer end of shaft C.

Between these two sets of ball bearings 42 and 52 on shaft C is fixed the drive pulley F.

I prefer to have the two central openings 26 and 27 of substantially the same size and the screw holes such as are indicated in Fig. 4 at 29 and 129 on both sides of the same size and distance from the center and from each other so that the hanger B can be attached to either side and so that the hanger arms 33 and 34 can be adjusted at any desired angle to clear a belt such as P. Inlet collar L can also be attached interchangeably to either side.

As shown in Fig. 5, I may use a hanger such as H having three arms such as 60, 61 and 62 attached to a disc 63 having slots 64 for bolts 65, and having an outer clamp 66 for an outer ball bearing 67, and an inner clamp and ball bearing not shown.

I claim:

1. The combination with a blower casing having an air outlet and oppositely disposed dish shaped walls with oppositely disposed circular central openings; of a hanger comprising a supporting disc having circumferential fastening slots and an inner clamp; hanger arms fixed to the disc and extending out therefrom; an outer clamp at the end of said arms; inner shaft ball bearings held by the inner clamp; outer shaft ball bearings held by the outer clamp; a drive shaft revoluble in said ball bearings; and a drive pulley carried by the shaft between said ball bearings.

2. The combination with a blower casing having an air outlet and oppositely disposed dish shaped walls with oppositely disposed circular central openings and fastening screw holes of equal size and disposed at equal distances around each of said openings; of a bodily movable hanger comprising a dish shaped disc having circumferential fastening slots adapted to register with the screw holes on either side of the casing and having an inner clamp fastened to the supporting disc, two hanger arms fixed to the disc and extending out therefrom in the opposite direction from the inner clamp, an outer clamp at the end of said arms, inner shaft ball bearings removably held by the inner clamp and outer shaft ball bearings removably held by the outer clamp, a drive shaft revoluble in said ball bearings and a drive pulley carried by the shaft between said ball bearings; and fastening screws which pass through the fastening slots into the fastening screw holes.

CHARLES O. GRANBERG.